US011133716B2

(12) United States Patent
Sato et al.

(10) Patent No.: US 11,133,716 B2
(45) Date of Patent: Sep. 28, 2021

(54) WIRELESS CHARGING DEVICE

(71) Applicant: TOYODA GOSEI CO., LTD., Kiyosu (JP)

(72) Inventors: Makoto Sato, Kiyosu (JP); Jun Imai, Kiyosu (JP); Toru Kanto, Kiyosu (JP)

(73) Assignee: TOYODA GOSEI CO., LTD., Kiyosu (JP)

( * ) Notice: Subject to any disclaimer, the term of this patent is extended or adjusted under 35 U.S.C. 154(b) by 0 days.

(21) Appl. No.: 16/904,221

(22) Filed: Jun. 17, 2020

(65) Prior Publication Data

US 2020/0412177 A1 Dec. 31, 2020

(30) Foreign Application Priority Data

Jun. 27, 2019 (JP) .............................. JP2019-120409

(51) Int. Cl.
*H02J 50/60* (2016.01)
*H02J 50/10* (2016.01)
*H02J 50/90* (2016.01)
*H02J 7/00* (2006.01)

(52) U.S. Cl.
CPC ............ *H02J 50/60* (2016.02); *H02J 7/0044* (2013.01); *H02J 7/00309* (2020.01); *H02J 7/007192* (2020.01); *H02J 50/10* (2016.02); *H02J 50/90* (2016.02)

(58) Field of Classification Search
CPC .. H02J 7/00034; H02J 7/0029; H02J 7/00309; H02J 7/0044; H02J 7/0047; H02J 7/007188; H02J 7/007192; H02J 7/025; H02J 7/027; H02J 7/042; H02J 50/10; H02J 50/12; H02J 50/60; H02J 50/80; H02J 50/90; H02J 2310/22

USPC ........................................................ 307/104
See application file for complete search history.

(56) References Cited

U.S. PATENT DOCUMENTS

| 10,739,822 B2* | 8/2020 | Choi ..................... G06F 1/1632 |
| 2009/0224723 A1 | 9/2009 | Tanabe |
| 2012/0235636 A1* | 9/2012 | Partovi .................. H02J 5/005 320/108 |
| 2012/0235637 A1 | 9/2012 | Tanabe |
| 2012/0326662 A1* | 12/2012 | Matsumoto ............ H02J 7/025 320/108 |

(Continued)

FOREIGN PATENT DOCUMENTS

JP   2009-219177 A   9/2009

*Primary Examiner* — Levi Gannon
(74) *Attorney, Agent, or Firm* — McGinn I.P. Law Group, PLLC.

(57) ABSTRACT

To realize a vertical type wireless charging device capable of detecting a metal foreign object. The wireless charging device comprises a holder, a power transmission coil, a thermal sensor, a controller, and a warning device. The power transmission coil is disposed outside the side part of the holder. The thermal sensor is disposed at the bottom part of the holder. When the temperature rising rate is not less than 20° C. per five minutes, the controller judges that a metal foreign object exists between the power transmission coil and the electronic device, and the foreign object generates unusual heat. The controller stops wireless charging from the power transmission coil to the electronic device. The controller starts the warning device to alert the user that a foreign object is mixed in the holder and generates unusual heat.

20 Claims, 1 Drawing Sheet

(56) References Cited

U.S. PATENT DOCUMENTS

| | | | | |
|---|---|---|---|---|
| 2013/0163635 A1* | 6/2013 | Karanth | ............... | H02J 50/10 |
| | | | | 374/45 |
| 2013/0257168 A1* | 10/2013 | Singh | ............... | H02J 50/12 |
| | | | | 307/104 |
| 2013/0328411 A1 | 12/2013 | Tanabe | | |
| 2014/0091756 A1* | 4/2014 | Ofstein | ............... | H01F 38/14 |
| | | | | 320/108 |
| 2015/0028849 A1* | 1/2015 | Covic | ............... | H02J 50/90 |
| | | | | 324/76.11 |
| 2015/0326061 A1* | 11/2015 | Davison | ............... | H02J 7/025 |
| | | | | 320/108 |
| 2016/0156213 A1* | 6/2016 | Yajima | ............... | H01M 10/623 |
| | | | | 320/152 |
| 2018/0152040 A1* | 5/2018 | Yeon | ............... | H02J 7/027 |
| 2018/0288898 A1* | 10/2018 | Jeong | ............... | H02J 7/007192 |
| 2019/0027954 A1* | 1/2019 | Lee | ............... | H02J 50/12 |
| 2019/0305577 A1* | 10/2019 | Yi | ............... | H02J 50/10 |

\* cited by examiner

WIRELESS CHARGING DEVICE

BACKGROUND OF THE INVENTION

Field of the Invention

The present invention relates to a vertical type wireless charging device.

Background Art

An electromagnetic induction type (Qi (R) standard) charger operating at a frequency of 150 kHz to 210 kHz is known as a mobile phone wireless charger. Generally, a wireless charger has a flat plate shape, and adopts a horizontal type structure where a mobile phone is placed sideways and charged on the flat plate.

A horizontal type wireless charger requires an installation space larger than the area of mobile phone. A vertical type wireless charger has been developed to reduce an installation space. The vertical type wireless charger requires a holder to vertically hold the mobile phone.

Patent Document 1 discloses a contactless charging apparatus that can suppress heat generation of a foreign object even when a chargeable device and a non-chargeable foreign object are placed on the charging apparatus at the same time. In the charging apparatus disclosed in Patent Document 1, a plurality of Hall elements detect a device, a radio wave is transmitted to the device, and the reply received from the IC tag is used to judge whether or not it is a chargeable device. When it is judged to be a non-chargeable foreign object, charging is controlled on the basis of the temperature of the foreign object sensed by thermistors arranged near the position of the foreign object. The charging apparatus disclosed in Patent Document 1 may be a vertical type.
Patent Document 1: Japanese Patent Application Laid-Open (kokai) No. 2009-219177

In the horizontal type wireless charger, a mobile phone is placed on a flat area, and there is no dead angle. Therefore, the user is highly likely to find a foreign object if any. When there is a foreign object, the mobile phone cannot be stably placed. Thus, the user easily finds a foreign object. Therefore, the horizontal type wireless charger is hardly affected by a foreign object.

However, in the vertical type wireless charger, a metal foreign object may be mixed in the holder. The bottom part of the holder is a dead angle for the user, and the user may not find the foreign object. Then, the metal foreign object may intrude into a gap between the mobile phone and the power transmission coil. When charging is started in that state, the foreign object may generate heat.

In the charging apparatus of Patent Document 1, there are problems such as a complicated apparatus structure and increased cost because a plurality of Hall elements and IC tag are used for detecting a foreign object.

SUMMARY OF THE INVENTION

In view of the foregoing, an object of the present invention is to realize a vertical type wireless charging device capable of detecting a metal foreign object.

According to an aspect of the present invention, a wireless charging device includes a holder being a cup-shaped container having a side part, a bottom part, and an opening upper part, for putting and vertically holding a power receiving device therein; a power transmission coil disposed at the side part of the holder for performing wireless charging for the power receiving device; a thermal sensor disposed at the bottom part of the holder for sensing heat in the holder; a controller for detecting heat generation of a foreign object in the holder based on the heat sensed by the thermal sensor, and controlling the power supply and the stop of the power supply to the power transmission coil, and a warning device for alerting the user of the existence of the foreign object when heat generation of the foreign object is detected.

The controller may start the warning device when a temperature rising rate is not less than a predetermined value based on the temperature sensed by the thermal sensor. The controller may stop the power supply to the power transmission coil when a temperature rising rate is not less than a predetermined value based on the temperature sensed by the thermal sensor. And also the controller may start the warning device and operate stop the power supply to the power transmission coil when the temperature rising rate is not less than the predetermined value based on the temperature sensed by the thermal sensor. The predetermined value may be a value of 20° C. per 5 minutes. This judgement with respect to the temperature rising rate prevents that heat generation of the power receiving device is incorrectly detected as heat generation of the foreign object.

The controller may restart the power supply to the power transmission coil when the temperature rising rate is less than another predetermined value less than the predetermined value based on the temperature sensed by the thermal sensor. Another predetermined value is any value less than the predetermined value. For example, the another predetermined value is 15° C. per 5 minutes.

The charging device may further include a cooler for cooling a foreign object. The controller may start a cooling operation of the cooler when heat generation of the foreign object is detected, and stop the cooling operation of the cooler when heat generation of the foreign object is not detected. Thus, the foreign object can be cooled without disturbing the detection of a foreign object by heat generation.

The thermal sensor may be a pyroelectric sensor, which can more accurately detect heat generation of a foreign object.

According to the present invention, a metal foreign object can be detected, thereby improving safety of a vertical type wireless charging device.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with the accompanying drawings, in which.

DETAILED DESCRIPTION OF PREFERRED EMBODIMENTS

A specific embodiment of the present invention will next be described with reference to the drawings. However, the present invention is not limited to the embodiments.

First Embodiment

Figure 1:
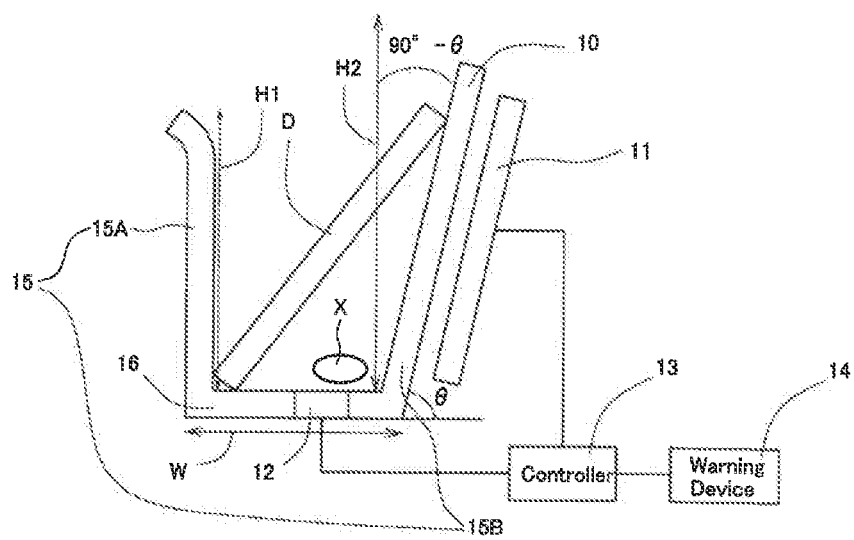
FIG. 1 shows the structure of a wireless charging device according to a first embodiment.

FIG. 1 shows the structure of a wireless charging device according to a first embodiment. The wireless charging device according to the first embodiment, as shown in FIG. 1, includes a holder 10, a power transmission coil 11, a thermal sensor 12, a controller 13, and a warning device 14. The wireless charging device according to the first embodiment is a device which vertically holds an electronic device D such as mobile phone and tablet terminal (corresponding to a power receiving device charged by the charging device of the present invention) in the holder 10, performs wireless charging for the electronic device D using electromagnetic induction method, and charges a battery of the electronic device D. Frequency is, for example, 150 kHz to 210 kHz, and output is, for example, 5 W to 50 W. The charging distance is 0 mm to 30 mm.

The holder 10 is an electronic device holder provided in the car interior. The holder 10 is a cup-shaped container having a side part 15, a bottom part 16, and an opening upper part. The holder 10 may be a bottomed container that is also used as a drink holder for holding drinks. The electronic device D is put in this container, supported with the side part 15 and the bottom part 16 of the container, and thus vertically held. Here, "vertically" means not only the state of forming an angle θ of 90° but the state of forming an angle θ of approximately 90° with respect to a horizontal surface, for example, the state of forming an angle θ not less than 45° with respect to a horizontal surface. The electronic device D is assumed to have a rectangular plate shape with a thickness of 8 mm to 25 mm and a long side of 60 mm to 150 mm.

The holder 10 may be made of any insulating material such as synthetic resin and wood as long as it is not heated during wireless charging.

The holder 10 has a truncated pyramid shape. Three of four side parts 15 (hereinafter referred to as side part 15A) is at an angle of 90° or approximately 90° with respect to the bottom part 16, other one (hereinafter referred to as side part 15B) is more largely inclined with respect to the bottom part 16 than the side part 15A. The inclination angle θ is, for example, 70° to 85°. The upper end of the side part 15A is curved toward the outside of the holder 10 so as to easily put the electronic device D in the holder 10. The height H1 of the side part 15A is 60 mm to 150 mm, and the height H2 of the side part 15B is higher than the height H1 of the side part 15A. For example, the height H2 of the side part 15B is higher by 10 mm to 50 mm than the height H1 of the side part 15A.

The above shape of the holder 10 allows the user to easily put the electronic device D in the holder 10, and the electronic device D to be held slightly inclined to the side part 15B. Thereby, the position and posture of the electronic device D is easily stabilized in the holder 10.

The width W of the bottom part 16 is set to 20 mm to 30 mm in a direction from the side part 15B toward the side part 15A opposite thereto. In the wireless charging device according to the first embodiment, since the power transmittable distance is 0 mm to 30 mm, the width W is set so that a distance from the power transmission coil 11 to the electronic device D falls within that range.

The shape of the holder 10 is not limited to the shape shown in the first embodiment, and may have any cup shape having side parts 15 and a bottom part 16. The bottom part 16 may be, for example, a rectangle, an oval, and a circle in a plan view. The side part 15 or the bottom part 16 is not necessarily a flat surface, and may have a curved surface. When the holder is used as a drink holder or the holder 10 is provided near the drink holder, liquid or the like may be accumulated in the bottom part 16. Therefore, an opening may be formed in a part of the bottom part 16 to discharge liquid to the outside.

The power transmission coil 11 performs charging for the power receiving coil of the electronic device D using electromagnetic induction method. The power transmission coil 11 is connected to the controller 13, and current flowing to the power transmission coil 11 is controlled by the controller 13. The power transmission coil 11 is disposed outside the side part 15B of the holder 10.

In the first embodiment, only one power transmission coil 11 is disposed, however, a plurality of power transmission coils 11 may be disposed. The shape, the number of turns, and the wire diameter of the power transmission coil 11 can be set according to the desired charging characteristics. In the first embodiment, the power transmission coil 11 is disposed outside the side part 15 of the holder 10. However, the power transmission coil 11 may be inside or embedded in the side part 15 of the holder 10.

The thermal sensor 12 is a device for detecting a metal foreign object X mixed in the holder 10 by heat, which is a pyroelectric sensor. The thermal sensor 12 is disposed at the bottom part 16 of the holder 10. A metal foreign object X fell on the bottom part 16 of the holder 10 can be more easily detected by disposing the thermal sensor 12 at the bottom part 16. A hole is formed on the bottom part 16 of the holder 10, the thermal sensor 12 is embedded therein, and a light-receiving surface of the thermal sensor 12 is exposed inside the holder 10. The light-receiving surface of the thermal sensor 12 is flush with the bottom surface of the holder 10. The thermal sensor 12 is connected to the controller 13, and an electric signal including temperature related information is input to the controller 13.

In the first embodiment, the thermal sensor 12 is disposed so as to be embedded in the bottom part 16 of the holder 10. However, the thermal sensor is not necessarily embedded in the bottom part 16, and may be disposed either inside or outside the bottom part 16. However, the thermal sensor 12 is preferably embedded in the bottom part 16 as in the first embodiment so as not to affect the stability of position or posture of the electronic device D put in the holder 10. If the thermal sensor 12 is disposed at a part closer to the side part 15 of the bottom part 16 (at the corner of the holder 10), the electronic device D may be located above the thermal sensor 12 and interfere with the thermal sensor 12 when putting and leaning the electronic device D in the holder 10. Therefore, the thermal sensor 12 is preferably disposed at a position away from the corner of the holder 10 (at the center of the bottom part 16). A plurality of thermal sensors 12 may be provided.

In the first embodiment, the thermal sensor 12 is a contactless type pyroelectric sensor. However, the sensor may be either a contact type or a contactless type. The contact type thermal sensor indirectly senses the heat of a metal foreign object X by sensing the temperature of the bottom part 16 of the holder 10. On the other hand, the contactless type thermal sensor can directly sense the heat of a metal foreign object X, and more accurately sense the heat of a foreign object X. Therefore, the thermal sensor 12 is preferably a contactless type. As a contactless type thermal sensor, a bolometer, a pyroelectric sensor, and a thermopile are known. However, a pyroelectric sensor is preferable as in the second embodiment to accurately detect a foreign object X. The temperature sensing range is preferably −10° C. to 10° C. at the lower limit, and 80° C. to 100° C. at the upper limit. Particularly in a range of 15° C. to 50° C., high accuracy is required. In a range of 15° C. to 50° C., the temperature can preferably be sensed within not more than one second.

The controller 13 is connected to the power transmission coil 11, the thermal sensor 12, and the warning device 14. The controller 13 is a device for controlling the supply of current to the power transmission coil 11 or the operation of the warning device 14 based on the temperature sensed by the thermal sensor 12. Detailed operation of the controller 13 will be described later.

The warning device 14 is connected to the controller 13. The warning device 14 is a device for alerting the user of the existence of a foreign object X based on the control of the controller 13, for example, by sounding an alarm sound, vibrating, lighting a LED lamp, or displaying an image on the display. Warning method may be changed according to the sensed temperature of a foreign object X. For example, when the sensed temperature of a foreign object X is 50° C. or higher, the alarm sound volume may be changed to a higher level, vibration may be increased, the lighting color of LED may be changed from yellow to red compared to when the sensed temperature is less than 50° C. The warning device 14 is not necessarily provided in the vicinity of the holder 10, and may be provided at a position away from the holder 10. When the warning device 14 is provided at a position away from the holder 10, the warning device 14 may be connected to the controller 13 by radio.

Next will be described the operation of the wireless charging device according to the first embodiment.

When the electronic device D is put in the holder 10, communication is performed between the wireless charging device according to the first embodiment and the electronic device D to judge whether or not the electronic device D is a chargeable device. When the electronic device D is judged to be chargeable, the controller 13 supplies the power to the power transmission coil 11, and wireless charging is started from the power transmission coil 11 to the power receiving coil of the electronic device D using electromagnetic induction method.

Here, the wireless charging device according to the first embodiment is a vertical type which vertically holds the electronic device D in the holder 10. Since the holder 10 has a cup shape, the inside of the holder easily becomes a dead angle for the user, and a foreign object X easily intrudes into the holder 10. Therefore, wireless charging may be started with a metal foreign object X positioned between the electronic device D and the power transmission coil 11. Particularly, in the wireless charging device according to the first embodiment, a gap is produced because the electronic device D is held slightly inclined to stabilize its position and posture, and thus is not in contact with the side part 15 of the holder 10. A metal foreign object X may intrude into the gap.

The controller 13 operates as follows based on the temperature sensed by the thermal sensor 12 and the temperature rising rate.

When the temperature rising rate of the temperature sensed by the thermal sensor 12 is less than 20° C. per five minutes, the controller 13 judges that a metal foreign object X does not exist between the power transmission coil 11 and the electronic device D or heat generation is low and unusual heat is not generated even if it exists therebetween. In this case, the controller 13 continues wireless charging from the power transmission coil 11 to the electronic device D.

On the other hand, when the temperature rising rate of the temperature sensed by the thermal sensor 12 is not less than 20° C. per five minutes, the controller 13 judges that a metal foreign object X exists between the power transmission coil 11 and the electronic device D, and the foreign object X generates unusual heat. The judgment threshold of 20° C. per five minutes is set by following reason. The electronic device D itself generates heat by charging the electronic device D, and the temperature rising rate of the surface temperature of the electronic device D normally rises to about 10° C. per five minutes. In this case, it is not necessary to output alarm. Accordingly, the judgment threshold (first threshold) is decided to prevent the false detection that normal heat generation of the electronic device D is due to heat generation by a foreign object X.

When the controller 13 judges that the foreign object X generates unusual heat, the controller 13 stops the power supply to the power transmission coil 11 to prevent a current from flowing to the power transmission coil 11, and stops wireless charging from the power transmission coil 11 to the electronic device D.

Moreover, the controller 13 starts the warning device 14 to alert the user with sound, light, and vibration that a foreign object X is mixed in the holder 10 and generates unusual heat, thereby urging the user to move the electronic device D and remove the foreign object X. For example, the controller alerts the user of unusual heat generation of a foreign object X by generating a warning sound from the warning device 14, vibrating the holder 10, lighting a lamp, and other methods. Particularly when the temperature sensed by the thermal sensor 12 is not less than 50° C., the controller 13 judges that the temperature of the foreign object X is dangerous, and alerts the user of that by the warning device 14. For example, a larger warning sound is generated, vibration is increased, and a LED light is blinked.

After that, when the temperature rising rate becomes any value (second threshold) less than 20° C. per five minutes, e.g., 15° C. per five minutes by removing the foreign object X from the holder 10, the controller 13 stops the operation of the warning device 14, restarts the power supply to the power transmission coil 11, and restarts wireless charging from the power transmission coil 11 to the electronic device D.

The above example is the case where a metal foreign object X has already intruded in the holder 10 before the start of charging. However, even in the case where a metal foreign object X intruded during wireless charging, a metal foreign object X can be detected by the same operation. That is, in either case where a foreign object X intruded into the holder 10 before or after the start of charging, it is judged that a foreign object X is generating unusual heat when the temperature rising rate of the temperature sensed by the thermal sensor 12 is not less than 20° C. per five minutes. Thus, unusual heat generation of a foreign object X can be distinguished from heat generation of the electronic device D itself by determining based on not the absolute temperature but the temperature rising rate.

As described above, the wireless charging device according to the first embodiment can detect a metal foreign object X existing between the electronic device D and the power transmission coil 11, and alert the user of the existence of the metal foreign object X. In the wireless charging device according to the first embodiment, charging can be continued in the case of a non-metallic foreign object. Moreover, when heat generation is low even in the case of a metal foreign object X, charging can be continued.

Variations

Figure 2:
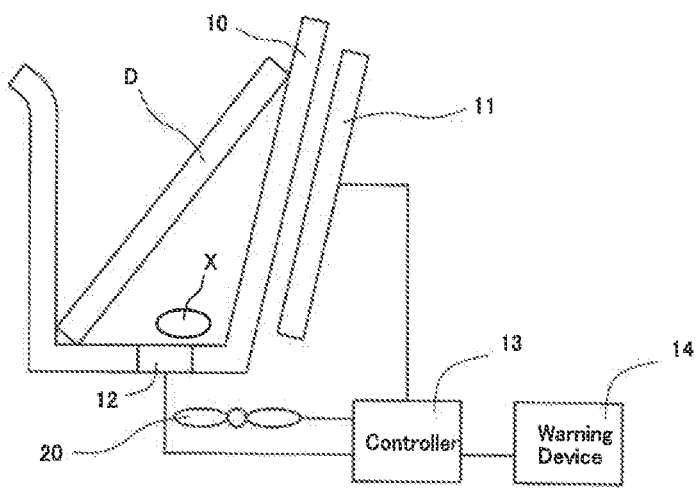
FIG. 2 shows a variation of the structure of the wireless charging device according to the first embodiment.

The wireless charging device according to the first embodiment may be further provided with a cooler 20 to cool a foreign object X generating unusual heat (refer to FIG. 2). When the controller 13 does not detect unusual heat generation of a foreign object X, that is, while the temperature rising rate is less than 20° C. per five minutes, the cooling operation of the cooler 20 is stopped. When the controller 13 detects unusual heat generation of a foreign object X, that is, when the temperature rising rate is not less than the first threshold, e.g., 20° C. per five minutes, the cooling operation is started and the power supply is stopped. When the temperature of the foreign object X is decreased by cooling the foreign object X with the cooler 20, and unusual heat generation of the foreign object X is not detected, the cooling operation of the cooler 20 is stopped again. When the temperature rising rate becomes to the value less than the second threshold, e.g., 15° C. per five minutes, the cooling operation is stopped and the power supply is restart. In this way, the cooler 20 is not always operated, thereby not disturbing the detection of a foreign object by heat generation.

Any cooling method, for example, fan cooling or water cooling may be used.

The wireless charging device according to the first embodiment is a device which performs charging using electromagnetic induction method. However, it may be a device which performs charging using resonant induction method. In that case, frequency is, for example, 1 MHz to 10 MHz, and output is, for example, 5 W to 50 W.

The wireless charging device according to the first embodiment is suitable for a device used as a drink holder or attached to a drink holder in the car interior.

The present invention can be employed to charge an electronic device such as smartphone or tablet terminal.

What is claimed is:

1. A wireless charging device, comprising:
    a holder being a cup-shaped container having a side part, a bottom part, and an opening upper part, for putting and vertically holding a power receiving device therein;
    a power transmission coil disposed at the side part of the holder for performing wireless charging for a power receiving device;
    a thermal sensor disposed at the bottom part of the holder for sensing heat in the holder;
    a controller for detecting heat generation of a foreign object in the holder based on the heat sensed by the thermal sensor, and controlling power supply and stop of the power supply to the power transmission coil; and
    a warning device for alerting a user of existence of the foreign object when heat generation of the foreign object is detected,
    wherein the controller starts the warning device when a temperature rising rate is no less than a rate of 20° C. per 5 minutes based on a temperature sensed by the thermal sensor.

2. The wireless charging device according to claim 1, wherein the controller stops the power supply to the power transmission coil when the temperature rising rate is not less than a predetermined value based on the temperature sensed by the thermal sensor.

3. The wireless charging device according to claim 2, wherein the predetermined value is 20° C. per 5 minutes.

4. The wireless charging device according to claim 2, wherein the controller restarts the power supply to the power transmission coil when the temperature rising rate is less than another predetermined value less than the predetermined value based on the temperature sensed by the thermal sensor.

5. The wireless charging device according to claim 2, further comprising a cooler for cooling the foreign object, wherein the controller starts a cooling operation of the cooler when the heat generation of the foreign object is detected, and stops the cooling operation of the cooler when the heat generation of the foreign object is not detected.

6. The wireless charging device according to claim 1, further comprising a cooler for cooling the foreign object, wherein the controller starts a cooling operation of the cooler when the heat generation of the foreign object is detected, and stops the cooling operation of the cooler when the heat generation of the foreign object is not detected.

7. The wireless charging device according to claim 1, wherein the thermal sensor is a pyroelectric sensor.

8. The wireless charging device according to claim 1, wherein the holder comprises a truncated pyramid shape and the side part comprises a first side part and a second side part, the second part being higher than the first side part.

9. The wireless charging device according to claim 8, wherein an angle between the second part and the bottom part is larger than an angle between the first part and the bottom part.

10. The wireless charging device according to claim 1, wherein the thermal sensor is disposed at a position away from a corner of the holder.

11. The wireless charging device according to claim 1, wherein a hole is formed on the bottom part, the thermal sensor is embedded therein, and a light-receiving surface of the thermal sensor is exposed inside the holder.

12. A wireless charging device, comprising:
    a holder being a cup-shaped container having a side part, a bottom part, and an opening upper part, for putting and vertically holding a power receiving device therein;
    a power transmission coil disposed at the side part of the holder for performing wireless charging for a power receiving device;
    a thermal sensor disposed at the bottom part of the holder for sensing heat in the holder;
    a controller for detecting heat generation of a foreign object in the holder based on the heat sensed by the thermal sensor, and controlling power supply and stop of the power supply to the power transmission coil; and
    a warning device for alerting a user of existence of the foreign object when heat generation of the foreign object is detected,
    wherein the controller stops the power supply to the power transmission coil when a temperature rising rate is not less than a rate of 20° C. per 5 minutes based on a temperature sensed by the thermal sensor.

13. The wireless charging device according to claim 12, wherein the thermal sensor is a pyroelectric sensor.

14. The wireless charging device according to claim 12, wherein the thermal sensor is disposed at a position away from a corner of the holder.

15. The wireless charging device according to claim 12, wherein a hole is formed on the bottom part, the thermal sensor is embedded therein, and a light-receiving surface of the thermal sensor is exposed inside the holder.

16. A wireless charging device, comprising:
    a holder being a cup-shaped container having a side part, a bottom part, and an opening upper part, for putting and vertically holding a power receiving device therein;
    a power transmission coil disposed at the side part of the holder for performing wireless charging for the power receiving device;
    a thermal sensor disposed at the bottom part of the holder for sensing heat in the holder;
    a controller for detecting heat generation of a foreign object in the holder based on the heat sensed by the thermal sensor, and controlling power supply and stop of the power supply to the power transmission coil; and a warning device for alerting a user of existence of the foreign object when heat generation of the foreign object is detected, wherein the holder comprises a truncated pyramid shape and the side part comprises a first side part and a second side part, the second side part being higher than the first side part.

17. The wireless charging device according to claim 16, wherein an angle between the second part and the bottom part is larger than an angle between the first part and the bottom part.

18. The wireless charging device according to claim 16, wherein the thermal sensor is disposed at a position away from a corner of the holder.

19. The wireless charging device according to claim 16, wherein a hole is formed on the bottom part, the thermal sensor is embedded therein, and a light-receiving surface of the thermal sensor is exposed inside the holder.

20. The wireless charging device according to claim 16, wherein an angle between the second part and the bottom part is larger than an angle between the first part and the bottom part, a hole is formed on the bottom part, the thermal sensor is embedded therein, a light-receiving surface of the thermal sensor is exposed inside the holder, and the thermal sensor is disposed at a position away from a corner of the holder.

\* \* \* \* \*